US008276826B2

(12) United States Patent
Schutzmann et al.

(10) Patent No.: US 8,276,826 B2
(45) **Date of Patent: *Oct. 2, 2012**

(54) SECURITY ELEMENT FOR DOCUMENTS OF VALUE

(75) Inventors: Jurgen Schutzmann, Pfaffenhofen (DE); Manfred Heim, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,598

(22) Filed: Jan. 20, 2012

(65) Prior Publication Data

US 2012/0118961 A1 May 17, 2012

Related U.S. Application Data

(63) Continuation of application No. 12/515,913, filed as application No. PCT/EP2007/010039 on Nov. 20, 2007, now Pat. No. 8,123,138.

(30) Foreign Application Priority Data

Nov. 22, 2006 (DE) ......................... 10 2006 055 169

(51) Int. Cl.
*G06K 19/06* (2006.01)

(52) U.S. Cl. ............. 235/493; 235/492; 283/67; 283/82

(58) Field of Classification Search .................. 235/493, 235/492; 283/67, 82
See application file for complete search history.

(56) References Cited

U.S. PATENT DOCUMENTS

| | | | |
|---|---|---|---|
| 5,378,885 | A | 1/1995 | Jones, Jr. et al. |
| 5,631,039 | A | 5/1997 | Knight et al. |
| 5,803,503 | A | 9/1998 | Kaule et al. |
| 5,889,271 | A | 3/1999 | Webb |
| 6,343,745 | B1 | 2/2002 | Bohm et al. |
| 2002/0056758 | A1 | 5/2002 | Stenzel et al. |
| 2006/0186203 | A1 | 8/2006 | Buttifant et al. |
| 2008/0090726 | A1 | 4/2008 | Eskra et al. |

FOREIGN PATENT DOCUMENTS

| | | | |
|---|---|---|---|
| DE | 2001944 | | 7/1971 |
| DE | 19650759 | A1 | 6/1998 |
| DE | 10131153 | A1 | 1/2003 |
| DE | 102004057326 | A1 | 6/2006 |
| EP | 1221679 | A1 | 7/2002 |
| EP | 1630751 | A2 | 3/2006 |
| GB | 2098768 | A | 11/1982 |
| WO | 9309532 | A1 | 5/1993 |
| WO | 9630880 | A1 | 10/1996 |

OTHER PUBLICATIONS

International Search Report in PCT/EP2007/010039, Mar. 4, 2008.
Search Report of German Patent Office regarding German Patent Application No. 10 2006 055 169.9, Jul. 6, 2007.

*Primary Examiner* — Allyson Trail
(74) *Attorney, Agent, or Firm* — Bacon & Thomas, PLLC

(57) ABSTRACT

Value documents including a security element having magnetic material for securing the value documents. Along the security element, for example along a longitudinal direction of the security element, there are disposed one or more magnetic areas and one or more gap areas. The extension of the magnetic areas or the gap areas along the security element is preferably chosen so that the magnetic signals of adjacent magnetization steps interfere constructively with each other when transported past the magnetic sensor.

30 Claims, 3 Drawing Sheets

SECURITY ELEMENT FOR DOCUMENTS OF VALUE

CROSS REFERENCE TO RELATED APPLICATION

This application is a continuation application of Ser. No. 12/515,913, filed May 21, 2009, which is the national stage entry of PCT/EP2007/010039, filed Nov. 20, 2007, which claims priority to German application DE 10 2006 055 169.9, filed Nov. 22, 2006, the entirety of all of said applications being incorporated herein by reference.

FILED OF THE INVENTION

This invention relates to a security element for securing value documents which has magnetic material. Further, the invention relates to a value document and to a film material having the security element and to a method for checking such a security element or value document.

BACKGROUND

A value document refers for the purposes of the invention to bank notes, but also shares, deeds, postage stamps, checks, admission tickets, travel tickets, air tickets, identity cards, visa stickers and the like, as well as labels, seals, packages, security paper or other elements for product protection. Therefore, the simplifying designation "value document" will hereinafter always include documents of the stated kind.

It is known that bank notes, for example, have magnetic material which is used for checking the authenticity of the bank notes. Such magnetic material is for example a component of printing inks and applied to the bank notes upon printing thereof. For checking the authenticity of the bank notes, the distribution of the magnetic material produced upon printing can be determined and compared to a specification. Further, it is known that magnetic material can be contained in security elements applied to the bank note. For example, security threads can have magnetic material which can be applied either continuously or in the form of a coding.

Further, it is known to embed security threads in bank-note paper partially or completely. A partially embedded security thread is visible only in certain places on the surface of the bank note, for example in periodically disposed windows in the bank-note paper. Upon viewing in reflected light, such a (continuously metallized) windowed security thread appears as a periodically visible metallization strip extending e.g. perpendicular to the longitudinal direction of the bank note.

For imitating a windowed security thread, forgers affix for example metallized film strips to forged bank notes which resemble a windowed security thread when viewed in reflected light. It has turned out that such forgeries cause a certain (inductive) measuring signal upon examination with magnetic sensors, although the metallized film strip has no magnetic material. On the other hand, authentic bank notes that are in a poor state can also cause a similar measuring signal. Hence, upon checking the bank notes there is a risk of bank notes that are authentic but in a poor state being incorrectly considered to be forgeries with thus imitated security threads and being mistakenly sorted out.

SUMMARY

Hence, the invention is based on the object of providing a more easily verifiable security element, a value document having the security element, and a film material having the security element, and an improved measuring method for checking value documents having the security element.

According to the invention, the security element has magnetic material which is applied to or incorporated in the security element. In particular, the security element possesses a magnetic coding which is formed by a certain arrangement of magnetic areas and gap areas. The security element has at least one magnetic area which continuously contains magnetic material and at least one gap area which continuously contains no magnetic material and/or which continuously has a lower remanent flux density than the magnetic area. The term "continuously" is to be understood for the purposes of this application as continuously along an imaginary straight line. The magnetic and gaps areas are disposed along the security element along a given direction which preferably extends parallel to a longitudinal direction of the security element. The longitudinal direction of the security element refers here to the direction in which the security element possesses its greatest extension.

To permit a clear differentiation from the imitated windowed security threads mentioned at the outset, a magnetic coding is applied, for example in the form of a few individual gap areas within an otherwise continuously magnetic security element. Alternatively, the magnetic coding can also be applied to form a few individual magnetic areas within a security element which is otherwise free from magnetic material or which otherwise continuously has magnetic properties which deviate from those of the magnetic areas. Preferably, the magnetic areas and/or the gap areas are disposed in or on the security element such that they differ from the arrangement of the windows on or in the substrate of the value document where the security element is visible on at least one surface of the value document, such as of the bank-note paper, or where the security element passes to at least one surface of the value document. The magnetic areas or the gap areas can be disposed along the security element for example periodically, but with a period deviating from the window period, but they can also be present on the security element in the form of individual non-periodically disposed areas. The security element has maximally five magnetic areas and/or maximally five gap areas along the given direction. However, the security element preferably possesses only maximally four or maximally three magnetic areas and/or gap areas along the given direction. It is in particular also possible, however, to use a security element with only one or with two magnetic areas and/or gap areas along the given direction. The statement of a number of magnetic areas or gaps areas along a given direction refers to the number of magnetic areas or gap areas in or on the security element that exist along an imaginary, straight line over the total security element.

The magnetic areas and/or gaps areas extend in one embodiment across the total width of the security element. The width of the security element is the extension perpendicular to the given direction along which the magnetic areas and/or gap areas are disposed, i.e. for example the extension of the magnetic areas and/or gap areas perpendicular to the longitudinal direction of the security element. In a further embodiment, the magnetic areas are disposed in one or in both edge areas of the security element. They can form one or more edge tracks disposed in or on the security element parallel to the given direction. For example, the magnetic areas of the security element can form two edge tracks extending parallel to each other. In or on the areas of the security element disposed outside the magnetic areas there can be provided identifying elements such as characters, symbols, text or also patterns. Said identifying elements can identify the security element individually, i.e. according to its area of application, e.g. according to the kind of value document to be secured. The identifying elements can be disposed on or in the security element outside the edge tracks, for example between the two edge tracks.

In a first embodiment, at least one magnetic area is extended along the given direction over at least 15 mm, preferably over at least 20 mm, particularly preferably over 20 mm to 40 mm. For example, all those magnetic areas that are limited along the given direction by gap areas—which excludes those magnetic areas that are limited along the given direction by an edge of the security element—extend over at least 15 mm, preferably over at least 20 mm, particularly preferably over 20 mm to 40 mm. In said first embodiment, at least one gap area—preferably all gap areas that are limited along the given direction by magnetic areas—extend along the given direction for example over 1 mm to 5 mm, preferably over 2 mm to 4 mm, particularly preferably over about 3 mm.

In a second embodiment, which is complementary to the first embodiment, at least one gap area extends along the given direction over at least 15 mm, preferably over at least 20 mm, particularly preferably over 20 mm to 40 mm. Preferably, all gap areas that are limited along the given direction by magnetic areas—which excludes those gap areas that are limited along the given direction by an edge of the security element—are extended over at least 15 mm, preferably over at least 20 mm, particularly preferably over 20 mm to 40 mm. For example, in said second embodiment, at least one magnetic area—preferably all those magnetic areas that are limited by gap areas along the given direction—extend along the given direction for example over 1 mm to 5 mm, preferably over 2 mm to 4 mm, particularly preferably over about 3 mm.

For realizing a continuously lower remanent flux density in a gap area, there can be chosen in the gap area for example a lower concentration of magnetic material than in the magnetic area. Alternatively or additionally, it is also possible that a smaller layer thickness or also a smaller width of the magnetic material or also a different magnetic material is applied in the gap area than in the magnetic area. In the gap area the remanent flux density and/or the concentration of magnetic material and/or the layer thickness and/or the width of magnetic material can be for example less than 50%, in particular less than 10%, of the remanent flux density and/or the concentration of magnetic material and/or the layer thickness and/or the width of magnetic material in the magnetic area.

In an especially preferred embodiment, the extension of the gap areas or the magnetic areas is so chosen that there results a constructive interference of the magnetic signals, in particular of the individual pulses, which are detected by a magnetic sensor at the beginning and at the end of the particular area. By means of the constructive interference of individual pulses there is obtained on the magnetic sensor a measuring signal with a greater maximum amplitude than the individual pulses themselves. This can be used advantageously in the case of relatively small signal amplitudes as occur for example with the magnetic signals of security threads in transverse transport of bank notes.

The magnetic areas and gap areas are limited along the given direction by magnetization steps. A magnetization step is understood for the purposes of the application to be a steplike change in remanent flux density which arises at the transition between a magnetic area and a gap area. In a first embodiment, the gap areas are limited along the given direction by a first and a second magnetization step. The first magnetization step of the gap area has a steplike drop in remanent flux density and/or concentration and/or layer thickness and/or width of the magnetic material, and the second magnetization step of the gap area has a steplike increase in remanent flux density and/or concentration and/or layer thickness and/or width of the magnetic material. The distance between the magnetization steps is preferably chosen so great along the given direction that the magnetic signals of the first and second magnetization steps of the gap area interfere constructively with each other. In other words, the extension of the gap area along the given direction is chosen so great that the magnetic signals of the two transitions from the magnetic area preceding upon the magnetic-signal measurement to the gap area and from the gap area to the magnetic area following upon the magnetic-signal measurement interfere constructively.

In a second embodiment, the magnetic areas are limited along the given direction by a first and a second magnetization step. The first magnetization step of the magnetic area has a steplike increase in remanent flux density and/or concentration and/or layer thickness and/or width of the magnetic material, and the second magnetization step of the magnetic area has a steplike drop in remanent flux density and/or concentration and/or layer thickness and/or width of the magnetic material. The distance between the magnetization steps is preferably chosen so great along the given direction that the magnetic signals of the first and second magnetization steps of the magnetic area interfere constructively with each other. In other words, the extension of the magnetic area along the given direction is chosen so great that the magnetic signals of the two transitions from the gap area preceding upon the magnetic-signal measurement to the magnetic area and from the magnetic area to the gap area following upon the magnetic-signal measurement interfere constructively.

The magnetic material used is for example magnetic pigments. The magnetic material has for example magnetically hard material, preferably one or more different iron compounds, particularly preferably one or more different iron oxides or magnetite.

The security element can either be produced directly on the value document or be prepared on a separate substrate. If it would cause difficulties to provide the value document directly with the magnetic materials for example, it may be expedient to prepare the construction of the security element at least partly on the separate substrate. The separate substrate to which the security element can be applied preferably has plastic and can be, or have, for example a film material, in particular a transfer material.

The security element, in particular the magnetic materials of the security element, can be applied for example in endless form to a carrier material of the transfer material. The fastening of the security element to a value document to be secured is effected here by means of an adhesive layer which is applied either to the value document or also to the uppermost layer of the transfer material. Preferably, a hot-melt adhesive is used therefor. To define the outline form of the security element, either an adhesive layer can be provided only in the areas to be transferred, or the adhesive is activated only in the areas to be transferred. After transfer, the carrier material of the transfer material is removed, leaving only the security element on the value document to be secured.

The value document to which the security element is applied may be for example a security paper, a security document, but also product packages. Other objects of value requiring security-type protection can of course also be provided with the inventive security element.

The security element can be applied for example to value documents in or on whose substrate, such as security paper, one or more windows are present. To improve the differentiation of authentic value documents from the forgeries mentioned at the outset, the gap areas and/or magnetic areas of the security element are disposed along the value document differently from the windows along the value document. The number of gap areas and/or the number of magnetic areas along the security element is preferably lower, preferably at least three lower, than the number of windows in or on the substrate of the value document where the security element is visible on at least one surface of the value document or where the security element passes to at least one surface of the value document.

Furthermore, the invention relates to a method for checking value documents having one or more security elements wherein magnetic signals of the security element are measured. For checking the value document or the security element, the value document is transported past a magnetic sensor, and the magnetic signals of the security element are sensed by means of the magnetic sensor and supplied to an evaluation device. The transport direction of the value documents is for example parallel to the longitudinal direction of the security element which is disposed in or on the value document. Preferably, the magnetic areas and gap areas are so disposed along the security element that at least the magnetic signals of two adjacent magnetization steps that limit a gap area or a magnetic area interfere constructively. The constructive interference of the magnetic signals can be obtained for example with magnetic sensors that operate inductively or also magnetoresistively.

The constructive interference of the magnetic signals of adjacent magnetization steps makes it possible to obtain an increase in maximum amplitude of the magnetic signal compared with the pulse provided by the magnetic signal of an individual magnetization step. This permits value documents or security elements with relatively weak magnetic signals arising from the individual magnetization steps to be checked for their magnetic properties more reliably.

Further advantages and embodiments of the invention will be explained more closely with reference to the figures. For reasons of clarity, the invention will be explained more closely only by the example of a bank note. However, it is evident that the invention can readily be used for the above-mentioned value documents.

BRIEF DESCRIPTION OF THE DRAWINGS

There are shown.

DETAILED DESCRIPTION OF EXEMPLARY EMBODIMENTS OF THE INVENTION

Figure 1:
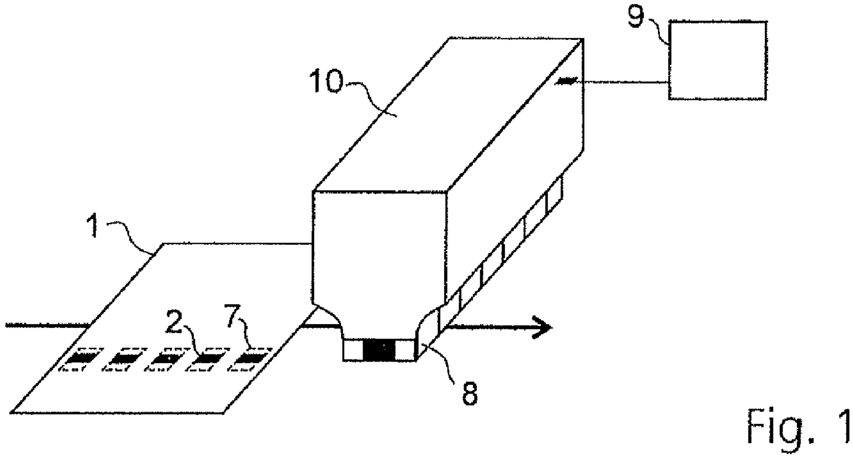
FIG. 1 a schematically shown arrangement comprising a magnetic sensor and a bank note being transported past the magnetic sensor and having an inventive security element (magnetic areas and gap areas not shown), FIGS. 2*a-d* four exemplary embodiments of a bank note having an inventive security element in each case, FIGS. 3*a-c* an embodiment of a bank note having an inventive security element (FIG. 3*a*) as well as exemplary embodiments of the security element along the line A-A in cross section (FIGS. 3*b*, 3*c*), FIGS. 4*a-c* schematic views of the magnetic signals S1, S2 of the two magnetization steps of a gap area, and of the superimposition of said magnetic signals to form the resulting magnetic signal S3 upon constructive interference.

In FIG. 1 there is shown schematically a detail of an apparatus for checking bank notes for their magnetic properties. Bank notes 1 or security elements 2 to be checked are transported through the apparatus by a transport system (not shown) along the transport direction shown by the arrow in FIG. 1. In the shown example, a bank note 1 is transported past an inductively operating magnetic sensor 10 in transverse transport. In so doing, the security element 2 which is disposed with its longitudinal direction along the transport direction of the bank note 1 is checked for its magnetic properties. The security element 2 is for example a security thread which is partially embedded in the bank-note substrate and passes to the surface thereof, or is visible on the surface thereof, only at windows 7. The magnetic sensor possesses a plurality of measuring tracks 8 which are disposed along a line perpendicular to the transport direction of the bank notes. The inductively operating magnetic sensor 10 recognizes as magnetic signals in each case temporal changes of magnetic properties in the recording area of the individual measuring tracks 8 of the magnetic sensor. When a security element 2 having continuous magnetic material with constant magnetic properties along the security element is transported past the magnetic sensor, the particular measuring tracks 8 would detect magnetic signals only at the beginning and end of the security element 2. However, when a security element 2 having one or more interruptions or gap areas in the magnetic material is transported past the magnetic sensor, additional magnetic signals arise at said interruptions or gap areas. The magnetic signals are transmitted by the magnetic sensor 10 to an evaluation device 9 which checks the authenticity and/or currency and/or denomination of the bank note 1.

Figure 2:
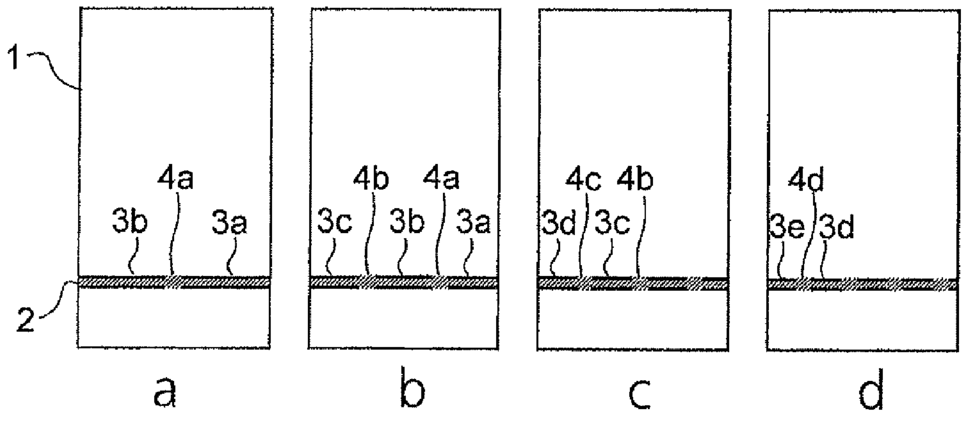

FIG. 2 shows four exemplary embodiments of a bank note 1 made of paper or plastic which is provided with a security element 2 in the form of a strip extending across the total width of the bank note 1. The bank note 1 can of course have further security features, such as a watermark, steel gravure printing, security thread, luminescent prints, etc. The security element 2 is disposed on the bank note 1, e.g. printed on, affixed or incorporated in the bank note 1. Along the security element 2 there are disposed a plurality of magnetic areas 3*a-e* with magnetic material, and a plurality of gap areas 4*a-d* which either have no magnetic material or have a lower remanent flux density than the magnetic areas 3*a-e*. This can be obtained e.g. by a corresponding choice of the layer thicknesses of the areas 3*a-e*, 4*a-d* and/or by a corresponding choice of the concentrations and/or width of the magnetic materials in the areas 3*a-e*, 4*a-d* and/or a corresponding choice of the materials in the areas 3*a-e*, 4*a-d*. In the shown examples, the magnetic areas 3*a-e* are disposed in the edge area of the security element 2 (the upper one in FIG. 2) and form an (upper) edge track parallel to the longitudinal direction of the security element 2. Furthermore, the shown security element 2 has further magnetic areas which are disposed parallel to the magnetic areas 3*a-e* and form a second (lower) edge track. Between the two edge tracks, which are in each case e.g. 0.2 to 0.4 mm wide, the security element 2 can additionally have identifying elements (not shown). By disposing two edge tracks with magnetic areas in or on the security element it is possible to realize a security element 2 which can both be provided with identifying elements and provide sufficient magnetic signal.

In the example of FIG. 2*a*, the security element 2 has only one gap area 4*a* and two magnetic areas 3*a* -b along its longitudinal direction. However, the security element 2 can also be equipped with a plurality of gap areas and a corresponding plurality of magnetic areas along the security element, as shown by the examples of FIG. 2*b* with two gap areas 4*a-b* and three magnetic areas 3*a-c*, of FIG. 2*c* with three gap areas 4*a-c* and four magnetic areas 3*a-d*, and of FIG. 2*d* with four gap areas 4*a-d* and five magnetic areas 3*a-e*. In said examples there are few, relatively short gap areas disposed along the otherwise magnetic edge tracks of the security element. Alternatively, the magnetic areas and gap areas can also be disposed along the edge tracks conversely, so to speak as the negative image of the arrangements from FIGS. 2*a-d*. In said examples there would then be few, relatively short magnetic areas disposed along the security element edge tracks otherwise provided with gap areas.

Figure 3A:
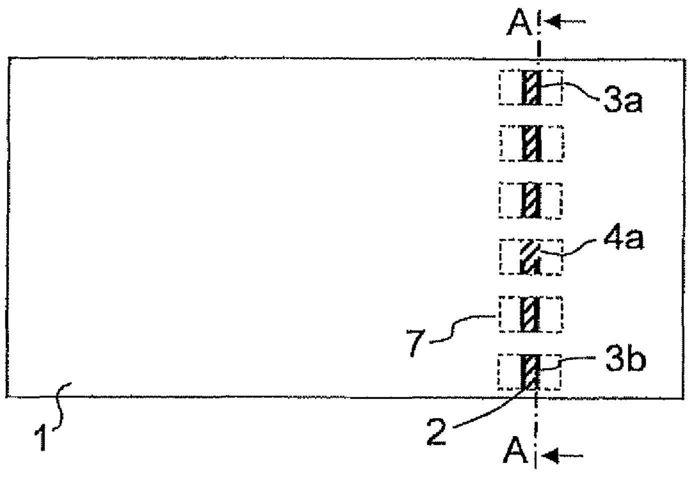

In FIG. 3*a* is an embodiment of a bank note 1 having a security element 2 which has two magnetic areas 3*a*, 3*b* and one gap area 4*a* along its longitudinal direction. The security element 2 is partially embedded in the substrate of the bank note 1, so that the security element 2, which is e.g. a windowed security thread, is visible only in windows 7. The security element 2 can also be embedded completely in the substrate of the bank note 1. In both cases magnetic signals can be detected.

Figure 3B:
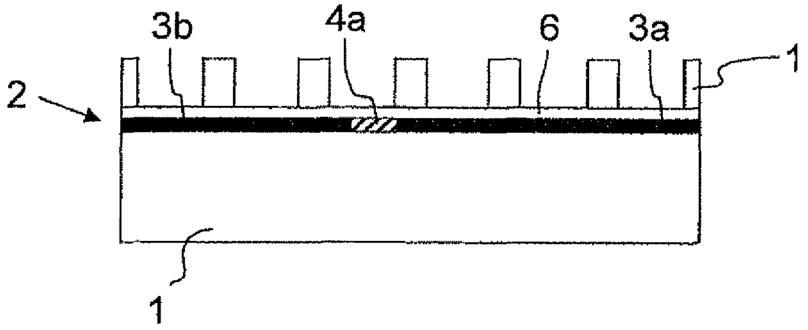
Figure 3C:
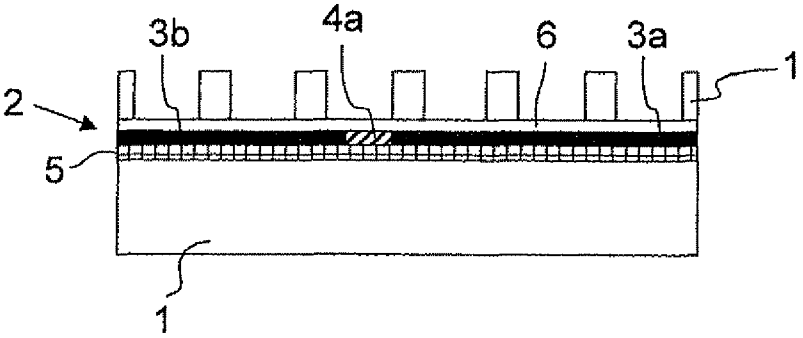

With reference to FIGS. 3*b-c* some preferred embodiments will be explained more closely, which show the bank note 1 in cross section along the dot-dashed line A-A to make the structure of the security element 2 clear. According to FIG. 3*b*, there is incorporated in or applied to the paper substrate or plastic substrate of the bank note 1 a security element 2 having magnetic areas 3*a*, 3*b* and a gap area 4*a*.

In the figures of the present application the inventive security element 2 is shown only schematically. What is essential to the inventive security element 2 is the number, arrangement and length of the magnetic areas and gap areas along the security element 2. To show the magnetic areas and gap areas of the inventive security element 2 more clearly, the figures hence omit the representation of further layers of the inventive security element 2. The actual realization of the layer structure can be effected according to the production methods known from the prior art. Thus, it is known e.g. from WO 92/11142 A1 to construct a security thread from a plurality of layers. It is possible at the same time to apply e.g. bars of magnetic material to a metal layer, cf. FIGS. 2 and 3 of said publication. The magnetic material can also be disposed within the layer structure, cf. the cross sections through the security threads of FIGS. 7 and 8 of said publication, which have two edge tracks with magnetic material parallel to the longitudinal direction of the security thread. The layer structure of the inventive security element 2 can be realized e.g. in the manner described in WO 92/11142 A1.

In certain embodiments, e.g. security elements that are exposed to high mechanical or chemical load during use, it is expedient to cover the magnetic areas and gap areas 3*a*, 3*b*, 4*a* with a protective layer 6. The protective layer 6 may be a film laminated over the security element 2, or a protective lacquer layer. The protective lacquer layer can be applied all over or in partial areas. For this purpose there can be used e.g. UV lacquers, hybrid lacquers, oleographic lacquers or dispersion lacquers of the one- or two-component type. The protective lacquer layer is preferably printed on, e.g. by flexographic printing or offset printing.

The security element 2 can also be disposed on a plastic film 5 which can be applied to the bank note 1 or be incorporated in the bank note 1, cf. FIG. 3*c*. The plastic film 5 with a layer comprising magnetic areas 3*a*, 3*b* and a gap area 4*a* disposed thereon can be affixed to the bank note 1, for example. For protection of the layer comprising magnetic areas 3*a*, 3*b* and gap areas 4*a*, the latter can be covered with a protective layer 6. Departing therefrom, there can be applied in and/or on the plastic film 5 a layer comprising magnetic areas 3*a*, 3*b* and gap areas 4*a* to which an adhesive layer (not shown) is finally applied for fastening the security element 2 to the bank note 1. In this case, an additional protective layer can be omitted, because the plastic film 5 forms a protective cover for the security element. In comparison to the representation in FIG. 3*c* this results in a reverse order of the security element 2 and the plastic film 5.

In all above-described cases the adhesive can also be applied to the bank note 1, rather than to the security element 2, for fastening the security element 2 to the bank note 1.

The security element 2 can also be configured as a so-called planchet which is preferably incorporated on the surface of the bank-note substrate.

As described above, the security element 2 can be produced directly on the bank note 1 or be made available as a separate security element 2 and fastened to the bank note 1. However, it can also be envisaged to provide a separate security element 2 whose construction is only completed, e.g. provided with a protective layer, after the security element 2 has been fastened to the bank note 1.

When the bank note 1 or the security element 2 is transported past a magnetic sensor 10, there arises upon each change in the magnetic field of the security element 2 a measuring signal which can be evaluated by an evaluation device 9, for example a microcomputer, to permit statements to be made e.g. about the authenticity and/or the type of bank note, cf. FIG. 1.

In a security element 2 having a plurality of magnetic areas 3*a-e* and a plurality of gap areas 4*a-d* along a given direction, as described above, there exists—upon corresponding premagnetization of the security element 2—a steplike change in magnetization, i.e. a magnetization step, at each transition between a magnetic area and a gap area. When the security element 2 is transported past the magnetic sensor 10 there arises for each magnetization step a pulse in the measuring signal of at least one magnetic track 8 of the magnetic sensor 10. Hence, the detected measuring signal shows not only pulses at the beginning and at the end of the passing security element 2, but, in addition, pulses upon passing of the places in the security element 2 where the magnetic areas 3*a-e* and the gap areas 4*a-d* border on each other.

Figure 4A:
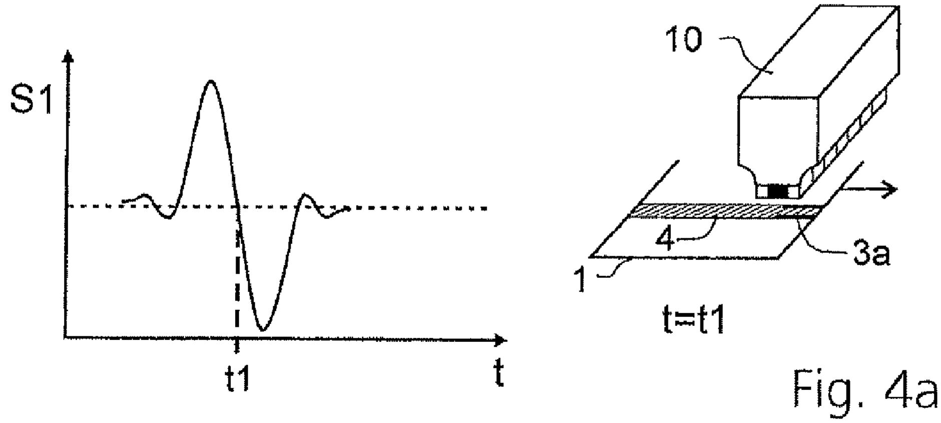
Figure 4B:
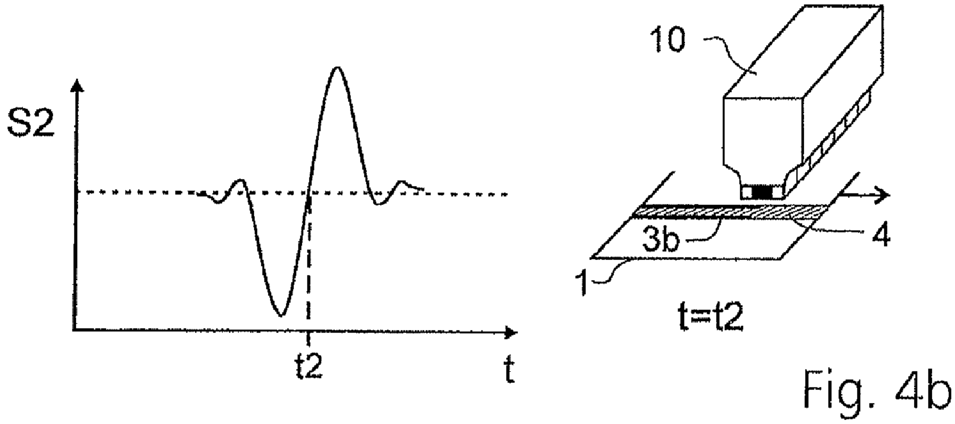
Figure 4C:
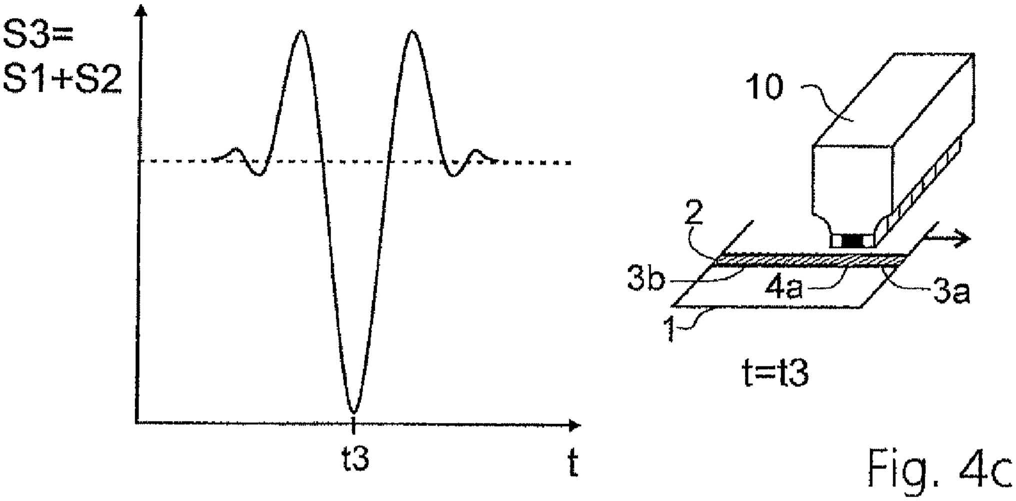

In the case of a magnetization step representing a steplike drop in magnetization at the time t=t1—as is present e.g. in the case shown in FIG. 4*a* between a magnetic area 3*a* and a gap area 4—there arises at the time t=t1 in the measuring signal S1 of the magnetic sensor 10 a first pulse which has the shape sketched in FIG. 4*a*. In the converse case of a steplike increase in magnetization—as is present e.g. between a gap area 4 and a magnetic area 3*b*, cf. FIG. 4*b*—there arises at the time t=t2 in the measuring signal S2 of the magnetic sensor 10 a second pulse with the form sketched in FIG. 4*b*, which is approximately point-symmetric to the shape of the first pulse. When a security element 2 is transported past the magnetic sensor, the measuring signal has both a steplike drop and a steplike increase in magnetization at a suitable distance apart. As shown e.g. in FIG. 4*c* with the areas 3*a*, b and 4*a*, there arises at the magnetic sensor 10 approximately a measuring signal S3 which results from the sum of the measuring signals Si and S2. The extension of the gap area 4*a* along the transport direction of the security element 2 is advantageously so chosen that the measuring signals S1 and S2 of the two magnetization steps interfere constructively with each other. At the time t=t3 there arises in the case of the constructive interference a pulse with a clearly higher maximum amplitude than the maximum amplitudes of the individual pulses of the measuring signals S1 and S2.

For a constructive interference of the magnetic signals S1 and S2 it is necessary that the first and second pulses at least partly overlap in time. Furthermore, it is necessary that the instantaneous amplitudes of the two pulses in this time overlap area add up to a higher instantaneous total amplitude in comparison to the instantaneous amplitudes of the individual pulses. These conditions are satisfied for example by the magnetic signals of FIGS. 4*a-c*.

The distance between the magnetization steps necessary for a constructive interference, or the extension of the gap area or magnetic area whose magnetization steps are to cause constructively interfering magnetic signals, depends crucially on the temporal width of the individual pulses, in particular on the relative temporal position of the maxima of the first and second pulses. This can be subject to several influence variables. Generally, the temporal width of the individual pulses depends on the operation mode, e.g. inductive or magnetoresistive, and the geometry of the magnetic sensor used. In the case of the inductively operating magnetic sensor 10, the shape of the magnetic signal is influenced e.g. by the spatial extension of the recording area of the magnetic sensor 10. Both the arrangement and the extension of pole shoes by which the inductive magnetic sensor 10 operates play a part here. Furthermore, the shape of the magnetic signal also depends on the distance (chosen perpendicular to the transport direction) between the passing security element 2 or value document 1 and the magnetic sensor 10. The ideal distance between the magnetization steps in order for a constructive interference of the magnetic signals to comes about thus depends on the particular realization of the magnetic-signal measurement and must be determined experimentally in particular cases. In the shown example of the inductive magnetic sensor 10, said ideal distance is about 3 mm.

The invention claimed is:

1. A security element for securing value documents, comprising:

at least one magnetic area which continuously contains magnetic material, and at least one gap area which continuously contains no magnetic material or which continuously has a lower remanent flux density than the magnetic area, wherein the at least one magnetic area and the at least one gap area being disposed along a given direction, wherein the at least one magnetic area is limited steplike along the given direction by a first and second magnetization step, the first magnetization step having an increase in the remanent flux density and/or concentration and/or a layer thickness and/or a width of the magnetic material, and the second magnetization step having a drop in the remanent flux density and/or a concentration and/or a layer thickness and/or a width of the magnetic material.

2. The security element according to claim 1, wherein the security element has maximally four magnetic areas and/or maximally four gap areas along the given direction.

3. The security element according to claim 1, wherein the given direction extends parallel to a longitudinal direction of the security element.

4. The security element according to claim 1, wherein the magnetic areas and/or the gap areas extend across the total width of the security element.

5. The security element according to claim 1, wherein the magnetic areas are disposed in an edge area of the security element.

6. The security element according to claim 1, wherein the security element includes further magnetic areas along a direction extending parallel to the given direction.

7. The security element according to claim 1, wherein at least one magnetic area or at least one gap area extends along the given direction over at least 15 mm.

8. The security element according to claim 1, wherein all magnetic areas that are limited along the given direction by gap areas, or all gap areas that are limited along the given direction by magnetic areas, extend along the given direction over at least 15 mm.

9. The security element according to claim 1, wherein the continuously lower remanent flux density of the gap area is obtained by a lower concentration of the magnetic material and/or by a lower layer thickness and/or by a lower width of the magnetic material and/or by a different magnetic material in the gap area than in the magnetic area.

10. The security element according to claim 9, wherein the remanent flux density and/or the concentration and/or the layer thickness and/or the width of the magnetic material of the magnetic material of the gap area is less than 50% of the remanent flux density and/or the concentration and/or the layer thickness and/or the width of the magnetic material.

11. The security element according to claim 1, wherein at least one gap area that is limited along the given direction by magnetic areas, or at least one magnetic area that is limited along the given direction by gap areas, extends along the given direction over 1 mm to 5 mm.

12. The security element according to claim 1, wherein all those gap areas that are limited along the given direction by magnetic areas, or all those magnetic areas that are limited along the given direction by gap areas, extend along the given direction over 1 mm to 5 mm.

13. The security element according to claim 1, wherein the magnetic material has magnetically hard material.

14. The security element according to claim 1, wherein the security element is configured as a security thread or a planchet or a label.

15. A film material having at least one security element according to claim 1.

16. The film material according to claim 15, wherein the film material is configured as a transfer material.

17. A value document having at least one security element according to claim 1.

18. The value document according to claim 17, comprising a substrate on and/or in which a plurality of windows are present where the security element extends to at least one surface of the value document, wherein the arrangement of the magnetic areas and/or of the gap areas along the security element differs from the arrangement of the windows on and/or in the value document.

19. The value document according to claim 18, wherein the number of gap areas and/or the number of magnetic areas along the security element is smaller than the number of windows.

20. The value document according to claim 17, wherein the value document comprises a security paper, a security document or a product package.

21. The method for checking value documents as described in claim 17 comprising the steps:

transporting the value document past a magnetic sensor for measuring the magnetic properties of the value document, sensing the magnetic signals of the security element by means of the magnetic sensor, wherein the magnetic signals of the first and second magnetization steps of the magnetic area interfere constructively with each other.

22. The method according to claim 21, wherein the transport of the value document past the magnetic sensor is effected parallel to the given direction.

23. The security element according to claim 1, wherein the first and second magnetization steps of the magnetic area have a distance apart along the given direction by which the magnetic signals of the first and second magnetization steps interfere constructively with each other.

24. A security element for securing value documents, comprising:

at least one magnetic area which continuously contains magnetic material, and at least one gap area which continuously contains no magnetic material or which continuously has a lower remanent flux density than the magnetic area, wherein the at least one magnetic area and the at least one gap area being disposed along a given direction, wherein the at least one gap area is limited steplike along the given direction by a first and a second magnetization step, the first magnetization step having a drop in the remanent flux density and/or a concentration and/or a layer thickness and/or a width of the magnetic material, and the second magnetization step having an increase in the remanent flux density and/or a concentration and/or a layer thickness and/or a width of the magnetic material.

25. The security element according to claim 24, wherein the first and second magnetization steps of the gap area have a distance apart along the given direction by which the magnetic signals of the first and second magnetization steps interfere constructively with each other.

26. A value document having at least one security element according to claim 24.

27. The method for checking value documents as described in claim 26 comprising the steps:

transporting the value document past a magnetic sensor for measuring the magnetic properties of the value document, sensing the magnetic signals of the security element by means of the magnetic sensor, wherein the magnetic signals of the first and second magnetization steps of the gap area interfere constructively with each other.

28. The method according to claim 27, wherein the transport of the value document past the magnetic sensor is effected parallel to the given direction.

29. A film material comprising at least one security element as recited in claim 24.

30. The film material according to claim 29, wherein the film material is configured as a transfer material.

* * * * *